United States Patent
Shelestak et al.

(10) Patent No.: US 7,727,917 B2
(45) Date of Patent: Jun. 1, 2010

(54) LITHIA-ALUMINA-SILICA CONTAINING GLASS COMPOSITIONS AND GLASSES SUITABLE FOR CHEMICAL TEMPERING AND ARTICLES MADE USING THE CHEMICALLY TEMPERED GLASS

(75) Inventors: Larry J. Shelestak, Bairdford, PA (US); George B. Goodwin, Cranberry Township, PA (US); Amarendra Mishra, Allison Park, PA (US); James M. Baldauff, Pittsburgh, PA (US)

(73) Assignee: Schott AG, Mainz (DE)

( * ) Notice: Subject to any disclaimer, the term of this patent is extended or adjusted under 35 U.S.C. 154(b) by 1170 days.

(21) Appl. No.: 10/956,500

(22) Filed: Oct. 1, 2004

(65) Prior Publication Data

US 2005/0090377 A1    Apr. 28, 2005

Related U.S. Application Data

(60) Provisional application No. 60/514,136, filed on Oct. 24, 2003.

(51) Int. Cl.
C03C 3/085    (2006.01)
C03C 3/087    (2006.01)
C03C 3/083    (2006.01)

(52) U.S. Cl. .............................. 501/69; 501/70; 501/68; 501/6; 501/7

(58) Field of Classification Search .................... 501/6, 501/7, 68, 69, 70
See application file for complete search history.

(56) References Cited

U.S. PATENT DOCUMENTS

| | | | |
|---|---|---|---|
| 2,779,136 A | 1/1957 | Hood et al. | |
| 3,218,220 A | 11/1965 | Weber | |
| 3,301,649 A | 1/1967 | Marusak | |
| 3,357,876 A | 12/1967 | Rinehart | |
| 3,380,818 A | 4/1968 | Smith | |
| 3,410,673 A | 11/1968 | Marusak | |
| 3,445,316 A | 5/1969 | Megles | |
| 3,485,702 A | 12/1969 | Mochel | |
| 3,615,320 A | 10/1971 | Junge et al. | |
| 3,625,718 A | 12/1971 | Petticrew | |
| 3,752,729 A | 8/1973 | Mochel | |
| 3,788,865 A | 1/1974 | Babcock et al. | |
| 3,790,430 A | 2/1974 | Mochel | |
| 3,847,583 A * | 11/1974 | Dislich et al. ............. | 65/33.4 |
| 3,867,166 A * | 2/1975 | Sullivan ................. | 427/376.4 |
| 3,900,329 A | 8/1975 | Grubb et al. | |
| 3,907,577 A * | 9/1975 | Kiefer et al. ................ | 501/4 |
| 3,926,602 A * | 12/1975 | Andrus et al. ............... | 65/33.8 |
| 3,954,487 A | 5/1976 | Gliemeroth et al. | |
| 3,962,602 A | 6/1976 | Dietz | |
| 3,970,463 A * | 7/1976 | Planchock et al. ........... | 501/4 |
| 3,990,877 A | 11/1976 | Simmons | |
| 4,015,045 A | 3/1977 | Rinehart | |
| 4,038,090 A | 7/1977 | Gliemeroth | |
| 4,042,403 A | 8/1977 | Reade | |
| 4,055,703 A | 10/1977 | Rinehart | |
| 4,059,454 A | 11/1977 | Reade | |
| 4,100,001 A * | 7/1978 | Franklin .................. | 501/4 |
| 4,140,645 A * | 2/1979 | Beall et al. ............... | 501/4 |
| 4,156,755 A | 5/1979 | Rinehart | |
| 4,192,688 A * | 3/1980 | Babcock et al. ............. | 501/7 |
| 4,375,235 A | 3/1983 | Tsai | |
| 4,438,210 A | 3/1984 | Rittler | |
| 4,455,160 A | 6/1984 | Rittler | |
| 4,461,839 A * | 7/1984 | Rittler .................... | 501/4 |
| 4,632,687 A | 12/1986 | Kunkle et al. | |
| 4,755,488 A | 7/1988 | Nagashima | |
| 4,814,297 A | 3/1989 | Beall et al. | |
| 4,919,697 A | 4/1990 | Pecoraro | |
| 5,364,685 A | 11/1994 | Nakashima et al. | |
| 5,446,008 A * | 8/1995 | Krolla et al. .............. | 501/68 |

(Continued)

FOREIGN PATENT DOCUMENTS

| | | |
|---|---|---|
| CN | 1089926 A | 7/1994 |
| DE | 1496586 A1 | 6/1969 |
| DE | 2313442 A1 | 10/1999 |
| FR | 1542517 | 10/1968 |
| FR | 2132269 | 11/1972 |
| GB | 996731 | 6/1965 |
| GB | 1080275 | 8/1967 |
| JP | 60-180936 A | 9/1985 |
| JP | 05-070174 A | 3/1993 |
| JP | 2000-344544 A | 12/2000 |
| JP | 2001-354446 A | 12/2001 |

OTHER PUBLICATIONS

Kloss, T. et al., "Advances in the Process of Floating Borosilicate Glass and Some Recent Applications for Borosilicate Glass," *Journal of Glass Technology*, vol. 4, No. 6, pp. 177-181 (Dec. 2000).

*Primary Examiner*—Karl E Group
*Assistant Examiner*—Elizabeth A Bolden
(74) *Attorney, Agent, or Firm*—Baker & Daniels LLP

(57) ABSTRACT

A glass composition for chemical tempering includes oxides in wt % ranges of: $SiO_2$ 60 to 75; $Al_2O_3$ 18 to 28; $Li_2O$ 3 to 9; $Na_2O$ 0 to 3; $K_2O$ 0 to 0.5; CaO 0 to 3; MgO 0 to 3; $ZrO_2$ 0 to 3; where MgO+CaO is 0 to 6 wt %; $Al_2O_3+ZrO_2$ is 18 to 28 wt %, and $Na_2O+K_2O$ is 0.05 to 3.00 wt %. The glass has a log 10 viscosity temperature in the temperature range of 1328° F. (720° C.) to 1499° F. (815° C.); a liquidus temperature in the temperature range of 2437° F. (1336° C.) to 2575° F. (1413° C.), and a log 7.6 softening point temperature in the temperature range of 1544° F. (840° C.) to 1724° F. (940° C.). The chemically tempered glass has, among other properties, an abraded modulus of rupture of 72 to 78 KPSI, and a modulus of rupture of 76 to 112 KPSI.

10 Claims, No Drawings

U.S. PATENT DOCUMENTS

| | | | |
|---|---|---|---|
| 5,492,869 A * | 2/1996 | Beall et al. ................ 501/7 |
| 5,512,520 A * | 4/1996 | Pfitzenmaier ............. 501/7 |
| 5,593,929 A | 1/1997 | Krumwiede et al. |
| 5,773,148 A | 6/1998 | Charrue et al. |
| 5,928,793 A | 7/1999 | Kimura |
| 5,972,460 A | 10/1999 | Tachiwana |
| 6,025,025 A | 2/2000 | Bartrug |
| 6,027,766 A | 2/2000 | Greenberg et al. |
| 6,436,859 B1 | 8/2002 | Muramoto et al. |
| 6,698,244 B1 | 3/2004 | Romer et al. |
| 6,846,760 B2 | 1/2005 | Siebers et al. |
| 2002/0023463 A1 | 2/2002 | Siebers et al. |

* cited by examiner

LITHIA-ALUMINA-SILICA CONTAINING GLASS COMPOSITIONS AND GLASSES SUITABLE FOR CHEMICAL TEMPERING AND ARTICLES MADE USING THE CHEMICALLY TEMPERED GLASS

CROSS REFERENCE APPLICATION

This application claims the benefit of U.S. Provisional Patent Application Ser. No. 60/514,136, filed Oct. 24, 2003, which application is incorporated herein in its entirety.

BACKGROUND OF THE INVENTION

1. Field of the Invention

This invention relates to lithia-alumina-silica containing glass compositions and glasses suitable for chemical tempering, and to articles made using the chemically tempered glass, e.g. aircraft transparencies.

2. Technology and Utility Discussion

Chemical strengthening (or "chemical tempering") of glass involves an exchange of ions near the surface of the glass, e.g. a glass article with ions from an external source, typically a molten inorganic salt bath, to generate a zone near the surface of the glass which is in a state of compression relative to the interior portions of the glass. There are two types of ion exchange strengthening which differ substantially in theory and operation. The first type of ion exchange treatment is carried out above the strain point of the glass and has as its objective the alteration of the glass composition at the surface to lower the thermal coefficient of expansion in the surface layer. As the glass is cooled, a compressive stress develops at the surface of the glass due to the expansion differential. The first type of ion exchange strengthening is discussed in U.S. Pat. No. 2,779,136. The second type of ion exchange strengthening is characterized by treatment below the strain point of the glass. In the second type, the surface compression is generated by substituting large ions from an external source (e.g., a molten salt bath) for smaller ions in the glass. Typically, the substitution is sodium or potassium ions for lithium ions in a lithia-alumina-silica glass, e.g. of the type discussed in U.S. Pat. Nos. 3,218,220; 3,752,729; 3,900,329; 4,156,755 and 5,928,793, or potassium ions for sodium ions in a soda-alumina-silica glass, e.g. of the type discussed in U.S. Pat. Nos. 3,485,702; 3,752,729; 4,055,703, and 4,015,045.

Of the two types of ion exchange strengthening, the second (below the strain point) type is preferred for large-scale commercial use because maintaining the glass below its strain point avoids undesirable distortion defects in the glass. Of the two types of glass compositions, the lithia-alumina-silica glass compositions are preferred over the soda-alumina-silica glass compositions, and the preferred ion exchange is the sodium ion for the lithium ion. The lithia-alumina-silica glass compositions and the exchange of the sodium ion for the lithium ion are preferred because a deeper depth of ion exchange ("case depth") in a shorter period of time at lower temperatures can be obtained.

An appreciation of the selection of the lithia-alumina-silica glass compositions and the exchange of the sodium ion for the lithium ion is had when a comparison of the ionic crystal radius of the sodium, lithium and potassium ions is made. The sodium atom has an ionic crystal radius of about 95 picometers ("pm"), the lithium atom has an ionic crystal radius of 60 pm and the potassium ion has an ionic crystal radius of about 133 pm. The lithium ion having a smaller ionic crystal radius than the sodium ion requires less energy to displace from the glass than the sodium ion, and the sodium ion having a smaller ionic crystal radius than the potassium ion requires less energy than the potassium ion to displace the lithium ion from the glass.

As mentioned above, lithia-alumina-silica glasses are available, e.g. disclosed in U.S. Pat. Nos. 3,218,220; 3,752,729; 3,900,329; 4,156,755 and 5,928,793. As can be appreciated by those skilled in the art, it would be advantageous to provide additional lithia-alumina-silica glass compositions for ion exchange strengthening, and in particular lithia-alumina-silica glass compositions that can attain a higher strength than the presently available lithia-alumina-silica glass compositions.

SUMMARY OF THE INVENTION

This invention relates to glasses and glass compositions. In a nonlimiting embodiments of the invention the glasses and glass compositions are chemically strengthened and include, but are not limited to, glasses having the following ingredients in the recited wt % ranges and the following properties. In one nonlimiting embodiment of the invention, the glasses includes:

| Ingredient | Percent by weight |
| --- | --- |
| $SiO_2$ | 60 to 75 |
| $Al_2O_3$ | selected from the group of 18 to 29; 18 to 28, 19 to 28.5, and 20 to 25 |
| $Li_2O$ | 3 to 9 |
| $ZrO_2$ | 0 to 3 | where $Al_2O_3+ZrO_2$ defined as NF is selected from the group of 18 to 28 wt %, 19 to 27 wt %; 20 to 26 wt %; 18 to 29 wt %, 19 to 28.5 wt % and 20 to 26 wt %, and wherein the glass has at least one of the following properties (a) a log 10 viscosity temperature of at least 1280° F. (694° C.) and (b) a liquidus temperature of at least 2350° F. (1288° C.).

Additional nonlimiting embodiments of the invention include:

A. glasses having the wt % range of $SiO_2$ in the range of 64 to 72 wt %, the wt % range of $Al_2O_3$ in the range of 20 to 25 wt %, and the wt % range of $Li_2O$ in the range of 4.5 to 7 wt %, and the glass has a log 10 viscosity temperature range of at least 1413° F. (767° C.) and a liquidus temperature of at least 2436° F. (1336° C.);

B. glasses having:

| Ingredient | Percent by weight |
| --- | --- |
| $SiO_2$ | 63.42 to 74.29 |
| $Al_2O_3$ | 18.26 to 28.51 |
| $Li_2O$ | 4.94 to 7.5 |
| $Na_2O$ | 0.39 to 2.39 |
| $K_2O$ | 0.07 to 0.25 |
| CaO | 0 to 1.27 |
| MgO | 0 to 2.6 |
| $SO_3$ | 0 to 0.19 |
| Total iron as $Fe_2O_3$ | 0.05 to 0.061 |
| $MnO_2$ | 0 to 0.02 |
| $ZrO_2$ | 0 to 1.5 |
| Total tin as $SnO_2$ | 0 to 0.5 |
| $TiO_2$ | 0 to 1.89 |
| $P_2O_5$ | 0 to 1.06 |
| ZnO | 0 to 0.5 |
| $B_2O_3$ | 0 to 2 |

-continued

| Ingredient | Percent by weight |
|---|---|
| NF ($Al_2O_3 + ZrO_2$) | 18.26 to 28.51 |
| RO (CaO + MgO) | 0.04 to 2.64 |
| $R_2O$ ($Na_2O + K_2O$) | 0.49 to 2.49; |

C. glasses having:

| Ingredient | Percent by weight |
|---|---|
| $SiO_2$ | 64.83 to 69.29 |
| $Al_2O_3$ | 21 to 23.51 |
| $Li_2O$ | 4.94 to 6.5 |
| $Na_2O$ | 0.39 to 2 |
| $K_2O$ | 0.07 to 0.1 |
| CaO | 0 to 1.27 |
| MgO | 0 to 2.49 |
| $SO_3$ | 0 to 0.19 |
| Total iron as $Fe_2O_3$ | 0.05 to 0.061 |
| $MnO_2$ | 0 to 0.02 |
| $ZrO_2$ | 0 to 1.19 |
| Total tin as $SnO_2$ | 0 to 0.5 |
| $TiO_2$ | 0 to 1.89 |
| $P_2O_5$ | 0 to 1.06 |
| ZnO | 0 to 0.5 |
| $B_2O_3$ | 0 to 1.55 |
| NF ($Al_2O_3 + ZrO_2$) | 21 to 23.51 |
| RO (CaO + MgO) | 0.04 to 2.54 |
| $R_2O$ ($Na_2O + K_2O$) | 0.49 to 2.07; | and D. glasses having a log 10 viscosity in the temperature range of 1328° F. (720° C.) to 1499° F. (815° C.); a liquidus temperature in the temperature range of 2437° F. (1336° C.) to 2575° F. (1413° C.), and a log 7.6 softening point temperature in the temperature range of 1544° F. (840° C.) to 1724° F. (940° C.).

Additional nonlimiting embodiments of the invention include glass composition having:

| Ingredient | Percent by weight |
|---|---|
| $SiO_2$ | 60 to 75 |
| $Al_2O_3$ | 18 to 28 |
| $Li_2O$ | 3 to 9 | wherein the glass composition has a log 10 viscosity temperature of at least 1413° F. (767° C.) and/or a liquidus temperature of at least 2436° F. (1336° C.).

In addition to the above ingredients the glass composition can further include:

| | |
|---|---|
| $Na_2O$ | 0 to 3 |
| $K_2O$ | 0 to 0.5 |
| CaO | 0 to 3 |
| MgO | 0 to 3 |
| $SO_3$ | 0 to 0.20 |
| Total iron as $Fe_2O_3$ | 0 to 1.25 |
| $ZrO_2$ | 0 to 3 |
| Total tin as $SnO_2$ | 0 to 0.70 |
| $TiO_2$ | 0 to 5 |
| $P_2O_5$ | 0 to 1.75 |
| ZnO | 0 to 1.25 |
| $B_2O_3$ | 0 to 1.75 | where CaO+MgO defined as RO is 0 to 6 wt %; $Al_2O_3$+$ZrO_2$ defined as NF is 18 to 28 wt %, and $Na_2O+K_2O$ defined as $R_{20}$ is 0.05 to 3.00 wt %.

In another nonlimiting glass composition includes:

| Ingredient | Percent by weight |
|---|---|
| $SiO_2$ | 64.60 to 69.29 |
| $Al_2O_3$ | 21.97 to 23.51 |
| $Li_2O$ | 4.94 to 6.50 |
| $Na_2O$ | 0.39 to 2.00 | wherein the glass composition has a log 10 viscosity temperature of at least 1413° F. (767° C.) and/or a liquidus temperature of at least 2436° F. (1336° C.), and optionally can further include:

| | |
|---|---|
| $K_2O$ | 0.07 to 0.25 |
| CaO | 0.00 to 1.27 |
| MgO | 0.00 to 2.49 |
| $SO_3$ | 0.00 to 0.19 |
| Total iron a $Fe_2O_3$ | 0.05 to 0.15 |
| $MnO_2$ | 0.00 to 0.02 |
| $ZrO_2$ | 0.00 to 1.50 |
| Total tin as $SnO_2$ | 0.00 to 0.50 |
| $TiO_2$ | 0.00 to 1.89 |
| $P_2O_5$ | 0.00 to 1.06 |
| ZnO | 0.00 to 0.57 |
| $B_2O_3$ | 0.00 to 1.55 | where RO is 0.04 to 2.54 wt %; NF is 22.00 to 23.51 wt %, and $R_{20}$ is 0.49 to 2.04 wt %.

In a still further nonlimiting embodiment of the invention the glass composition includes:

| Ingredient | Percent by weight |
|---|---|
| $SiO_2$ | 64.83 to 69.29 |
| $Al_2O_3$ | 21.97 to 23.51 |
| $Li_2O$ | 4.94 to 6.50 |
| $Na_2O$ | 0.39 to 2.00 |
| $K_2O$ | 0.07 to 0.10 | wherein the glass composition has a log 10 viscosity temperature of at least 1413° F. (767° C.) and/or a liquidus temperature of at least 2436° F. (1336° C.) and $R_2O$ is 0.49 to 2.07 wt %.

The glass composition can optionally include:

| | |
|---|---|
| CaO | 0.00 to 1.27 |
| MgO | 0.00 to 2.49 |
| $SO_3$ | 0.00 to 0.19 |
| Total iron as $Fe_2O_3$ | 0.05 to 0.15 |
| $MnO_2$ | 0.00 to 0.02 |
| $ZrO_2$ | 0.00 to 1.19 |
| $SnO_2$ + SnO | 0.00 to 0.50 |
| $TiO_2$ | 0.00 to 1.89 |
| $P_2O_5$ | 0.00 to 1.06 |
| ZnO | 0.00 to 0.50 |
| $B_2O_3$ | 0.00 to 1.55 | where RO is 0.89 to 2.49 wt % and NF is 21.00 to 23.51 wt %.

Nonlimiting embodiments of the invention include, but are not limited to a chemically tempered glass piece having a case depth wherein the case depth is the distance from a surface of the glass piece that has been chemically tempered to a point in the glass piece interior at which there is zero stress. The glass within the case depth is in compression and is defined as the glass in the compression zone. The interior of the glass piece at a depth greater than the case depth is under tension and is defined as the glass within the tensile stress zone. In another nonlimiting embodiment of the invention, the glass within the tensile stress zone has a nonlimiting glass composition of the invention discussed above.

Additional nonlimiting embodiments of the chemically tempered glass of the invention include:
- the glass within the tensile stress zone having a higher concentration of lithium than the glass in the compression zone;
- the glass piece has a case depth in the range of 7 to 16.5 mils (0.17 to 0.419 millimeters);
- the center tension in the glass piece is in the range of 5,700 to 14,900 pounds per square inch (39 to 103 mega Pascal ("mPa"));
- the glass has a CTA in the range of 632 to 1,390 pounds per inch (113 to 248 kilograms per centimeter);
- the glass has a modulus of rupture in the range of 76,000 to 120,000 pounds per square inch (524 to 827 mPa);
- the glass has an abraded modulus of rupture in the range of 67,000 to 89,000 pounds per square inch (462 to 614 mPa);
- the glass has a HV (Vicker's hardness) 1000 in the range of 586 to 614 kilograms force per square millimeters; and/or
- the glass has an HK (Knoop's hardness) 1000 in the range of 503 to 529 kilograms force per square millimeters.

The measuring techniques to determine case depth, center tension, CTA, modulus of rupture, abraded modulus of rupture, HV and HK are discussed below.

Another nonlimiting embodiment of the invention includes an aircraft transparency having, among other things, a mounting frame and a transparency secured to the mounting frame. The transparency includes at least one chemically tempered glass sheet, the chemically tempered glass sheet having a case depth, wherein the glass in the tensile stress zone includes a nonlimiting glass composition of the invention. The glass sheet has one or more of the properties of the chemically tempered glass of the invention discussed above.

The aircraft transparency can optionally have a hydrophobic coating and/or a self cleaning coating on the outer surface.

The invention further contemplates a method of chemically strengthening a glass piece having a nonlimiting glass composition of the invention to provide a chemically strengthened glass ply having one or more of the properties discussed above.

DETAILED DESCRIPTION OF THE INVENTION

It is understood that in the following discussion all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 5.5 to 10. Additionally, any reference "incorporated by reference" means incorporation of the entire reference.

In the discussion of thermal properties of glass compositions or glasses as they relate to temperatures for melting glass batch materials, fining the molten glass and/or forming a glass ribbon from the fined molten glass, the following terms are usually used and have the following meanings. The terms "melting temperature" and "$T_M$" mean the temperature of the glass at which the viscosity of the glass is log 2 or 100 poise; the terms "forming temperature" and "$T_F$" mean the temperature of the glass at which the viscosity of the glass is log 4, or 10,000 poise, and the terms "liquidus temperature" and "$T_L$" mean the temperature at which minute crystals are in equilibrium with the liquid phase of the glass melt. The difference between $T_F$ and $T_L$ is referred to as the "forming window", "working range" or "$\Delta T$" and is a common measure of the crystallization potential of a given melt composition. The lower the $\Delta T$, in other words the smaller the difference between the forming temperature and the liquidus temperature, the greater the crystallization potential. It is understood that the above terms when used in the discussion of the nonlimiting embodiments of the invention and in the claims shall have the above meaning.

The term "strain point" as used herein means the temperature at which stresses in glass having a log viscosity of 14.5, or $10^{14.5}$ poise are relieved after 4 hours. The term "annealing point" as used herein means the temperature at which stresses in glass having a log viscosity of 13, or 1013 poise are relieved in 15 minutes. The term "case depth" means the distance measured from a surface of a glass piece to a position in the interior of the glass piece at which there is zero stress in the glass piece. The glass within the case depth is also referred to as "glass in the compression zone." As can be appreciated by those skilled in the art, the case depth is not always equal to the ion exchange depth in the glass piece. The ion exchange depth is the depth in the glass piece where the concentration of the new, exchanged ion is about equal to the concentration of the new exchanged ion in the interior of the glass piece. The surface can be any surface of the glass piece exposed to the molten salts of the ion exchange bath, e.g. but not limiting to the invention the sodium nitrate molten bath. In the general practice of chemical tempering glass, a glass piece is submerged in a sodium nitrate molten bath. In this instance, all the surfaces of the glass piece exposed to the molten bath have a case depth. Further, the composition of the glass piece within the compression zone has a composition different from portions of the glass piece outside the compression zone also referred to as "glass in the tensile stress zone". Stated another way, the "glass in the tensile stress zone" is the internal portion of the glass piece spaced from the surface of the glass piece a greater distance than the case depth. The reason for the differences in the compositions in the tensile stress zone of the glass piece and in the compression zone of the glass piece is that the portion of the glass piece within the compression zone has more sodium ions than the portion of the glass piece in the tensile stress zone. It is understood that the above terms when used in the discussion of the nonlimiting embodiments of the invention and in the claims shall have the above meanings.

In the following discussion of the nonlimiting embodiments of the glass compositions of the invention, the ingredients are given in weight percent ("wt %"); however, as can be appreciated, the invention is not limited thereto and the ingredients can be given in any dimension, e.g. moles or mole percent, which identifies the quantity of the ingredient in the batch materials or the quantity of the ingredient, e.g. oxide in the glass composition. Further in the following discussion the wt % range of an ingredient or material in the glass identified as an "impurity" or a "tramp" means that the impurity or tramp ingredient or material present in the glass within the wt % range is an impurity or tramp ingredient or material whether purposely added to the batch materials or present in the batch materials as an impurity or tramp material or ingredient.

The invention and/or the practice of the invention, but not limiting thereto, will be discussed using a generic glass system that includes lithia ($Li_2O$), alumina ($Al_2O_3$), silica ($SiO_2$) and alkali and alkaline earth metal oxides, e.g. a glass system that includes $Li_2O$, $Al_2O_3$ and $SiO_2$, and selected ones and/or selected amounts of $Na_2O$, MgO, $SnO_2$, $P_2O_5$, $B_2O_3$ and $K_2O$, and optionally other metal oxides either as additions or tramp materials, e.g. but not limiting the invention thereto, CaO, $SO_3$, $Fe_2O_3$, $TiO_2$, $MnO_2$, $ZrO_2$ and ZnO.

$SiO_2$, $Al_2O_3$, $B_2O_3$, $P_2O_5$, $ZrO_2$ and $SnO_2$ when present in the glass are network formers. It can be inferred that as $SiO_2$, which is the largest oxide component of the glass composition in terms of weight percent, is reduced in a given composition of this type, the melt viscosity and the resulting log 4 forming temperature drops and vice versa. $SiO_2$ is included to provide a glass that has high temperature stability and chemical durability. Low concentrations of $SiO_2$, e.g. lower than 50 wt %, decrease the durability of the glass whereas higher concentrations, e.g. higher than 80 wt %, require higher melting temperatures and longer melting times. In the practice of the invention, nonlimiting embodiments of the invention, include, but are not limited to, $SiO_2$ in a range selected from the group of 60 to 75 wt %, 62 to 72 wt % and 64 to 72 wt %.

$Al_2O_3$ is present in the glass system to increase the glass strength after ion exchange and to promote the ion-exchange propensity. High $Al_2O_3$ concentrations in glass, e.g. above 7 wt %, increase the strain point of the glass, which allows performing the ion exchange at higher temperatures, e.g. above 752° F. (400° C.), resulting in faster ion exchange rates, deeper case depth and higher ion exchange penetration. Higher concentrations of $Al_2O_3$, e.g. higher than 30 wt %, also increase the melting temperatures of the glass and result in a glass having poor acid durability. Concentrations of $Al_2O_3$ in glass lower than 7 wt % decrease the case depth. In the practice of the invention, nonlimiting embodiments of the invention include, but are not limited to, $Al_2O_3$ in a range selected from the group of 18 to 29 wt %, 18 to 28 wt %, 19 to 28.5 wt % and 20 to 25 wt %.

$B_2O_3$ and $P_2O_5$ are network formers and are optionally added to the batch materials to lower the log 2 melting viscosity of the glass. $B_2O_3$ and $P_2O_5$ each in amounts below 0.05 wt % in the glass are considered an impurity or a tramp ingredient. In the practice of the invention, nonlimiting embodiments of the invention include, but are not limited to, $B_2O_3$ in a range selected from the group of 0 to 1.75 wt %, e.g. no greater than 1.75 wt %; 0 to 1.5 wt %, e.g. no greater than 1.5 wt %; 0 to 1.25 wt %, e.g. no greater than 1.25 wt %; 0 to 2.5 wt %, e.g. no greater than 2.5 wt %; 0 to 2.25 wt %, e.g. no greater than 2.25 wt %, and 0 to 2 wt %, e.g. no greater than 2 wt %. Further, in the practice of the invention, nonlimiting embodiments of the invention, include but are not limited to, $P_2O_5$ in a range selected from the group of 0 to 1.75 wt %, e.g. no greater then 1.75, preferably in the range of 0 to 1.5 wt %, e.g. no greater than 1.5 wt % and more preferably in the range of 0 to 1.25 wt %, e.g. no greater than 1.25 wt %.

$ZrO_2$, like $B_2O_3$ and $P_2O_5$, is a network former and is optionally added to the batch materials to lower the log 2 melting viscosity of the glass. $ZrO_2$ in amounts up to about 3 wt % increases the glass strength and lowers the melting temperature of the glass. $ZrO_2$ above 10 wt % increases the crystallization temperature and lowers the working range of the glass. In the practice of the invention, nonlimiting embodiments of the invention include, but are not limited to, $ZrO_2$ in a range selected from the group of 0 to 3 wt %, e.g. no greater than 3 wt %; 0 to 2 wt %, e.g. no greater than 2 wt %, and 0 to 1.75 wt %, e.g. no greater than 1.75 wt %.

The sum of wt % of $Al_2O_3$+$ZrO_2$ (hereinafter also referred to as "NF") is another parameter that describes the compositional envelope of a given glass. A lower value of $Al_2O_3$+$ZrO_2$ will typically result in a lower crystallization potential; a greater value of $Al_2O_3$+$ZrO_2$ will typically result in a higher crystallization potential for a given melt. In the practice of the invention, nonlimiting embodiments of the invention include, but are not limited to, NF in a range selected from the group of 18 to 28 wt %; 19 to 27 wt %; 20 to 26 wt %; 18 to 29 wt %; 19 to 28.5 wt %, and 20 to 26 wt %.

As discussed above, $SnO_2$ is a network former. During heating, $SnO_2$ gives up oxygen to form SnO as part of the fining process. As can be appreciated by those skilled in the art, the "total tin" content of the glass compositions disclosed herein is expressed in terms of $SnO_2$ in accordance with standard analytical practice, regardless of the form of tin actually present in the glass. In the practice of the invention, nonlimiting embodiments of the invention include, but are not limited to, $SnO_2$ in a range selected from the group of 0 to 0.7 wt %, e.g. no greater than 0.7 wt %; 0 to 0.6 wt %, e.g. no greater than 0.6 wt %, and 0 to 0.55 wt %, e.g. no greater than 0.55 wt %.

CaO and MgO are network modifiers and fluxes that aid in the melting of the network formers in the batch materials. It is the usual practice to refer to the sum of the wt % of CaO and MgO as RO, i.e. RO equals (CaO+MgO). Increasing RO will reduce the working window or ΔT; more particularly, increasing RO increases the fluidity of the resulting melt, i.e. decreases the viscosity and the forming temperature of the melt, and increases the crystallizability of the resulting melt, i.e. increases its liquidus temperature. In the practice of the invention it is preferred to reduce the wt % of the CaO because CaO slows down the lithium and sodium ion exchange thereby slowing down the rate of ion exchange. In the practice of the invention, nonlimiting embodiments of the invention include, but are not limited to, CaO in a range selected from the group of 0 to 3 wt %, e.g. no greater than 3 wt %; 0 to 2 wt %, e.g. no greater than 2 wt %, and 0 to 1.75 wt %, e.g. no greater than 1.75 wt %.

MgO has less effect than CaO in blocking the lithium and sodium ion exchange. In the practice of the invention, nonlimiting embodiments of the invention include, but are not limited to, MgO in a range selected from the group of 0 to 3 wt %, e.g. no greater than 3 wt %; 0 to 2.75 wt %, e.g. no greater than 2.75 wt %, and 0 to 2.5 wt %, e.g. no greater than 2.5 wt %. To aid in the melting of the network formers while providing an acceptable working range, e.g. above 10° C., in the practice of the invention, nonlimiting embodiments of the invention include, but are not limited to, RO in a range selected from the group of 0 to 6 wt %, e.g. no greater than 6 wt %; 0 to 5 wt %, e.g. no greater than 5 wt %, and 0 to 4 wt %, e.g. no greater than 4 wt %.

In the practice of the invention, ZnO can be used in place of or to reduce the amount of MgO and/or CaO. As can be appreciated by those skilled in the art of glass making, ZnO is not an alkaline earth but Zn has the +2 oxidation state and acts in a similar manner as Mg and Ca ions. In the practice of the invention, nonlimiting embodiments of the invention include, but are not limited to, ZnO in a range selected from the group of 0 to 1.25 wt %, e.g. no greater than 1.25 wt %; 0 to 1 wt %, e.g. no greater than 1 wt %, and 0 to 0.75 wt %, e.g. no greater than 0.75 wt %.

$Li_2O$ provides the Li ions, which are displaced from the glass by the sodium ion from an external source, e.g. a molten bath of sodium nitrate. It is preferred in the practice of the invention to have a sufficient and uniform distribution of Li ions in the glass so that the ion exchange of the Na ion for the Li ion provides a sufficient and uniform distribution of replacement Na ions in the glass from the external source. In the practice of the invention, nonlimiting embodiments of the invention include, but are not limited to, $Li_2O$ in a range selected from the group of 3 to 9 wt %: 4 to 7.5 wt %, and 4.5 to 7 wt %.

Sodium oxide is a flux aiding in the melting of the batch materials by lowering the glass viscosity. A tramp amount of $Na_2O$ in the glass is equal to or less than 0.05 wt %. In the practice of the invention, nonlimiting embodiments of the invention include, but are not limited to, $Na_2O$ in a range selected from the group of 0 wt % or a tramp amount to 3 wt %, e.g. no greater than 3 wt %; 0 wt % or a tramp amount to 2 wt %, e.g. no greater than 2 wt %, and 0 wt % or a tramp amount to 1.5 wt %, e.g. no greater than 1.5 wt %.

Potassium oxide, like sodium oxide, is a flux aiding in the melting of the batch materials by lowering the glass viscosity. A tramp amount of $K_2O$ in the glass is equal to or less than 0.07 wt %. In the practice of the invention, nonlimiting embodiments of the invention include, but are not limited to, $K_2O$ in a range selected from the group of 0 wt % or a tramp amount to 0.5 wt %, e.g. no greater than 0.5 wt %; 0 wt % or a trace amount to 0.35 wt %, e.g. no greater than 0.35 wt %, and 0 wt % or a trace amount to 0.3 wt %, e.g. no greater than 0.3 wt %.

A reduction of the wt % of $K_2O$ in the glass should be compensated for by an increase in the wt % of $Na_2O$ to maintain the viscosity level of the glass. It is the usual practice to refer the sum of the wt % of $Na_2O$ and $K_2O$ as "$R_2O$", i.e. $R_2O$ equals $Na_2O+K_2O$. In the practice of the invention, nonlimiting embodiments of the invention include, but are not limited to, $R_2O$ in a range selected from the group of 0 to 3 wt %, 0 to 2.25 wt %, and 0.15 to 1.75 wt %.

Other ingredients can intentionally be added to the batch materials to alter the properties of the glass, e.g. but not limiting the invention thereto, the color and solar absorption properties, or can be present in the batch materials as impurities. For example, but not limiting the invention thereto, Sample 5 discussed below had a tramp amount of 0.02 wt % $MnO_2$. The following is a nonlimiting discussion of ingredients that can be added to the glass system of the invention or can be present as impurities. As can be appreciated by those skilled in the art of making glass, and in particular making flat glass, ingredients other than those ingredients discussed below can be added to the glass system of the invention or can be present as impurities or tramp ingredients.

In a nonlimiting embodiment of the invention, $TiO_2$ is optionally added to the batch materials to lower the log 2 melting viscosity of the glass. $TiO_2$ in amounts below 0.05 wt % in the glass are considered an impurity or a tramp ingredient. $TiO_2$ in amounts up to 1 wt % are usually added to the batch materials to provide a glass having desired properties, e.g. solar control property. Amounts greater than 1 wt % can also be used to reduce ultraviolet transmission, e.g. see U.S. Pat. No. 5,593,929; however, $TiO_2$ above 1 wt % in the glass can react with the tin bath as the bottom surface of the glass moves on the tin bath through the forming chamber during the float glass process. The reaction turns the surface of the glass ribbon floating on the tin bath brown in color. As can be appreciated, $TiO_2$ above 1 wt %, e.g. up to 5 wt %, can be added to the batch materials, e.g. when glass color is not a required glass property, or when glass having a brown color is acceptable, or when the glass manufacturing process includes removing, e.g. grinding material from a surface of the glass, or when the glass is made by a sheet drawing process, e.g. the sheet drawing process developed by PPG Industries, Inc. and known in the trade under the registered trademark PENNVERNON, or the glass is made by the down draw or fusion sheet process. $TiO_2$ in amounts greater than 5 wt % are preferably not added to the batch materials because the liquidus temperature of the glass increases, which adversely affects the glass forming process. In the practice of the invention, nonlimiting embodiments of the invention include, but are not limited to, $TiO_2$ in a range selected from the group of 0 wt % or trace amount to 5 wt %, e.g. no greater than 5 wt %; 0 wt % or trace amount to 2 wt %, e.g. no greater than 2 wt %; 0 wt % or trace amount to 1 wt %, e.g. no greater than 1 wt %; 0 wt % or trace amounts to 0.75 wt %, e.g. no greater than 0.75 wt %, and 0 wt % or tramp amount to 0.5 wt %, e.g. no greater than 0.5 wt %.

$SO_3$ can be added to the batch materials as a fining agent. $SO_3$ is usually added to the batch materials as part of another batch ingredient, e.g. $CaSO_4.2H_2O$, usually added as gypsum, and/or $Na_2SO_4$, usually added as salt cake. $SO_3$ acts as a melting aid by preventing silica scum (sand grain agglomeration) formation. In a nonlimiting embodiment of the invention, when $SO_3$ is used for chemical refining, usually about 0.2 to 0.4 wt % of $SO_3$ is added to the batch directly or indirectly by way of other batch materials containing $SO_3$. Not all the $SO_3$ in the batch is retained in the glass melt or the glass. In nonlimiting embodiments of the invention, $SO_3$ in a range selected from the group of 0.02 to 0.2 wt %; 0.02 to 0.15 wt %, and 0.02 to 0.1 wt % is retained in the glass.

The practice of the invention contemplates chemically refining the molten glass using $SO_3$ and physically refining the molten glass, e.g. using a vacuum chamber as taught in U.S. Pat. No. 4,919,697, which patent is hereby incorporated by reference. When the glass is vacuum refined, the $SO_3$ present in the glass can be below detectable limits, e.g. below 10 parts per million ("ppm").

$Fe_2O_3$ is added to the batch as a coloring agent and as an aid to the refining of molten glass by establishing temperature gradients that provide thermal convections in the molten glass. If the $Fe_2O_3$ is only added to the glass to maintain proper temperature gradients, it may be omitted when mechanical facilities, e.g. stirrers, are used to homogenize the molten glass. Total iron in amounts below 0.05 wt % in the glass is considered an impurity, or tramp material or ingredient. As can be appreciated by those skilled in the art, the total iron content of the glass compositions disclosed herein is expressed in terms of $Fe_2O_3$ in accordance with standard analytical practice, regardless of the form of iron actually present. Likewise, the amount of iron in the ferrous state is reported as FeO, even though it may not actually be present in the glass as FeO. The term "total iron" means total iron expressed in terms of $Fe_2O_3$, and the term "FeO" means iron in the ferrous state expressed in terms of FeO. In the practice of the invention, nonlimiting embodiments of the invention include, but are not limited to, total iron in a range selected from the group of 0 wt % or a tramp amount to 1.25 wt %, e.g. no greater than 1.25 wt %; 0 wt % or a tramp amount to 1 wt %, e.g. no greater than 1 wt %, 0 wt % or a tramp amount to 0.5 wt %, e.g. no greater than 0.5 wt %, and 0 wt % or a tramp amount to 0.15 wt %, e.g. no greater than 0.15 wt %.

Besides the above mentioned ingredients, batch melting and/or refining agents, such as, but not limiting to the invention, NaCl, NaNO$_3$, KNO$_3$, BaSO$_4$, fluorides and combinations thereof can be added to the glass batch and/or glass melt. Agents to alter the properties of the glass, e.g. solar control properties and color, e.g. compounds containing cobalt, nickel, cerium, neodymium, erbium, chromium, copper, manganese, molybdenum, tungsten, lanthanum, gold, silver, selenium and combinations thereof can also be added to the glass batch and/or glass melt. As can be appreciated, the additions to the glass batch and/or glass melt should be concentrations in amounts not to impair the ion exchange properties of the glass.

As can be appreciated, the glass compositions of the invention can be produced from conventional glass-making materials properly compounded and thoroughly mixed so as to yield, when reacted, glasses of the desired composition. Suitable batch materials include, but are not limited to glass cullet, sand, soda ash (sodium carbonate), caustic soda (sodium hydroxide), magnesite, dolomite, talc, aluminum hydrate, feldspar, aplite, nepheline syenite, zircon sand, carbon, spodumene, lithium carbonate, and petalite.

The nonlimiting glass compositions of the invention have high temperature properties, e.g. a log 2 temperature in the range of 2732° F. to 3272° F. (1500° C. to 1800° C.), and do not lend themselves to melting, fining, homogenizing and forming in conventional float glass equipment, e.g., conventional overhead cross fire or end firing regenerative furnaces of the type used to melt soda-lime silicate glass batch materials and often referred to as Siemens furnaces. Furnaces of this type can be used for melting the glass batch of the invention, fining the melted glass batch and homogenizing the fined glass by making alterations to the firing equipment, e.g. but not limiting to the invention, using gas-oxygen fired equipment in the furnace and/or providing the furnace with electric boost, and/or lining the furnace walls with high temperature refractory. The molten glass composition of the invention can be formed in a float bath by lining the walls of the forming chamber with high temperature refractory. Other types of furnaces and processes that can be used in the practice of the invention are disclosed in U.S. Pat. Nos. 4,375,235 and 4,632,687, and in the article titled "Advances in the Process of Floating Borosilicate Glass and Some Recent Applications for Borosilicate Glass" by T. Kloss et al. published in the *Journal of Glass Technology*, Vol. 4, No. 6, December 2000, pages 177 to 181, which patents and publication is hereby incorporated by reference.

Nonlimiting Samples 1-10 incorporating features of the invention were made in the following manner. Batches, approximately 3000 grams per formulation, were prepared using commercial ingredients. Unless indicated otherwise, any glass samples made and discussed herein used commercial glass batch materials having known impurities or tramp materials. The impurities and the tramp materials were included in the calculation of the oxides in the glass samples. The weight of each ingredient was measured and used to determine the ingredients and wt % of the oxide in the glass. It was recognized that the volatilization of the materials could occur; however an assumption was made that volatilization would be at a minimum, and the calculations of the wt % of the oxides in the glass samples were made based on that assumption.

The batch for each sample was thoroughly mixed and about 1500 grams were charged into a platinum crucible and placed in an electric furnace heated to 2550° F. (1399° C.). After one hour, the remainder of the batch, about 1500 grams, was added to the crucible and the temperature increased to 2800° F. (1538° C.). The crucible remained in the furnace for an hour at 2800° F. (1538° C.); thereafter, the furnace temperature was increased to 2925° F. (1607° C.). After one hour, the glass melt (estimated to be at the log 3 temperature or 1000 poises) was removed from the furnace and poured into water at a temperature of 50° F. (10° C.). The solidified glass was dried, crushed, returned to the crucible and placed in the furnace at the temperature of 2925° F. (1607° C.). After one hour the glass melt was once again removed from the furnace and poured into cold water; the dried solidified glass was crushed and returned to the crucible and placed in the furnace at the temperature of 2925° F. (1607° C.). The temperature of the furnace was reduced to 2750° F. (1510° C.) and the crucible having the glass melt was left in the furnace overnight (approximately 15 to 16 hours). The next morning the furnace temperature was increased to 2925° F. (1607° C.). After one hour, the crucible was removed from the furnace and the molten glass poured onto a steel plate heated to 500° F. (260° C.) and the molten glass rolled with a steel cylinder. The glass slab was moved into a furnace heated to 1200° F. (649° C.) for 1 hour. The heating elements of the furnace were shut off, and the glass was left in the furnace to cool overnight to anneal the glass slab.

The compositions of Samples 1-10 are shown on Table 1 below. As discussed above, the wt % of the oxides of Samples 1-10 were calculated from the weight of the batch materials.

TABLE 1

Glass Composition of Laboratory Samples

| Oxide | SAMPLE NO. | | | | | | | | | |
|---|---|---|---|---|---|---|---|---|---|---|
| | 1 | 2 | 3 | 4 | 5 | 6 | 7 | 8 | 9 | 10 |
| SiO$_2$ | 66.68 | 66.78 | 66.78 | 67.78 | 69.29 | 64.83 | 65.23 | 68.3 | 68.17 | 66.67 |
| Al$_2$O$_3$ | 22 | 22 | 22 | 21 | 23.51 | 22.5 | 21.97 | 22 | 22 | 22 |
| Li$_2$O | 5.5 | 5.5 | 5.5 | 5.5 | 6.50 | 5.53 | 4.94 | 5.5 | 5.5 | 5.5 |
| Na$_2$O | 1 | 2 | 1.5 | 1.5 | 0.39 | 1.27 | 0.99 | 0.7 | 1 | 1 |
| K$_2$O | 0.07 | 0.07 | 0.07 | 0.07 | 0.1 | 0.07 | 0.07 | 0.15 | 0.15 | 0.15 |
| CaO | — | — | — | — | 0.04 | 0.05 | 1.27 | — | — | — |
| MgO | 2.2 | 1.6 | 1.6 | 1.60 | — | 2.49 | 0.89 | 1.5 | 1.5 | 1.5 |
| SO$_3$ | — | — | — | — | 0.09 | 0.09 | 0.19 | — | — | — |
| Fe$_2$O$_3$ | 0.05 | 0.05 | 0.05 | 0.05 | 0.061 | 0.05 | 0.05 | 0.05 | 0.05 | 0.05 |
| MnO$_2$ | — | — | — | — | 0.02 | 0.01 | 0.01 | — | — | — |
| ZrO$_2$ | — | — | — | — | — | — | 1.19 | — | — | 1.5 |

TABLE 1-continued

Glass Composition of Laboratory Samples

| Oxide | SAMPLE NO. | | | | | | | | | |
|---|---|---|---|---|---|---|---|---|---|---|
| | 1 | 2 | 3 | 4 | 5 | 6 | 7 | 8 | 9 | 10 |
| $SnO_2$ | 0.5 | 0.5 | 0.5 | 0.5 | — | 0.5 | 0.27 | 0.47 | 0.43 | 0.43 |
| $TiO_2$ | — | — | — | — | 0.01 | 0.01 | 1.89 | — | — | — |
| $P_2O_5$ | 1 | 1 | 1 | 1 | — | 1.05 | 1.06 | 0.76 | 0.68 | 0.68 |
| ZnO | — | — | 0.5 | 0.5 | — | — | — | 0.57 | 0.51 | 0.51 |
| $B_2O_3$ | 1 | 0.5 | 0.5 | 0.5 | — | 1.55 | — | — | — | — |
| BaO | — | — | — | — | — | — | — | 0.002 | 0.005 | 0.01 |
| Total (calc) | 100 | 100 | 100 | 100 | 100 | 100 | 100.02* | 100 | 100 | 100 |

*The total wt % for Sample 7 is greater than 100% due to a round-off error.

The surfaces of the glass slab of Samples 1-7 were viewed under 50× to 1000× magnification. The surface of the glass slab contacted by the steel roller (hereinafter also referred to as the "upper surface") had spaced clusters of massive amounts of crystallites having a size of about 15 to 50 microns. The clusters were randomly spaced from one another on the upper surface. The surface of the glass slab contacting the steel plate (hereinafter also referred to as the "lower surface") had a few spaced clusters of crystallites. The clusters on the lower surface had significantly fewer number of crystallites in the clusters than the upper surface of the slab. It was observed that Sample 5 did not have any clusters on the lower surface. Although the crystallites in the clusters of Samples 1-7 were not counted, visually it appeared that the clusters in the upper surface had 2 orders of magnitude more crystallites than the clusters of the lower surface. Approximately 0.03 inch (0.76 millimeters ("mm")) of the upper surface was removed using a abrasive slurry and the surface polished. The polished upper surface was viewed under 50× to 1000× magnification. The polished upper surface and the lower surface of the glass slab had approximately the same number of crystallites in the spaced clusters. An X-Ray diffraction of the crystallites was made and the results showed that the crystallites were phases of different crystals (LiAl$(SiO_3)_2$ and $LiAlSi_3O_8$) of lithium aluminum silicate and spodumene ($LiAlSi_2O_6$). The glass slabs of Samples 8-10 crystallized as they cooled to room temperature, and the crystallization resulted in the glass slab fracturing into fragments. As a result that properties of these samples could not be measured. The cause(s) of the crystallites observed in Samples 1-7, and the crystallization observed in Samples 8-10, has (have) not been determined. Mechanisms that are known to cause crystallites and crystallization include incomplete melting of, and impurities in, the batch materials that nucleate crystals, and phase separation.

As mentioned above, one of the mechanisms that can cause crystallites, e.g. the crystallites of the type observed in Samples 1-7, is incomplete melting of the batch ingredients. To determine if the cause of the crystallites is incomplete batch melting, Samples 11-16 having the compositions shown on Table 2 below were made.

TABLE 2

Glass Composition of Laboratory Samples

| Oxide | Sample No. | | | | | | | | | | Commercial Product A | Commercial Product B |
|---|---|---|---|---|---|---|---|---|---|---|---|---|
| | 11 | 12 | 13 | 14 | 15 | 16 | 17 | 18 | 19 | 20 | | |
| $SiO_2$ | 69.29 | 64.29 | 74.29 | 68.54 | 63.54 | 73.54 | 66.29 | 63.42 | 63.42 | 63.42 | 61.38 | 70.54 |
| $Al_2O_3$ | 23.51 | 28.51 | 18.51 | 23.26 | 28.26 | 18.26 | 26 | 24.87 | 24.87 | 24.87 | 18.02 | 19.25 |
| $Li_2O$ | 6.5 | 6.5 | 6.5 | 7.5 | 7.5 | 7.5 | 7 | 7 | 7 | 7 | 5.3 | 4.14 |
| $Na_2O$ | 0.39 | 0.39 | 0.39 | 0.39 | 0.39 | 0.39 | 0.39 | 2.39 | 2.39 | 0.39 | 10.79 | 0.26 |
| $K_2O$ | 0.1 | 0.1 | 0.1 | 0.1 | 0.1 | 0.1 | 0.1 | 0.1 | 0.1 | 0.1 | 0.11 | 0.23 |
| CaO | 0.04 | 0.04 | 0.04 | 0.04 | 0.04 | 0.04 | 0.04 | 0.04 | 0.04 | 0.04 | 0.11 | — |
| MgO | — | — | — | — | — | — | — | — | 2.6 | 2 | 0.05 | — |
| $SO_3$ | 0.09 | 0.09 | 0.09 | 0.09 | 0.09 | 0.09 | 0.09 | 0.09 | 0.09 | 0.09 | 0.08 | — |
| $Fe_2O_3$ | 0.061 | 0.061 | 0.061 | 0.061 | 0.061 | 0.061 | 0.061 | 0.061 | 0.061 | 0.061 | 0.118 | 0.05 |
| $MnO_2$ | 0.02 | 0.02 | 0.02 | 0.02 | 0.02 | 0.02 | 0.02 | 0.02 | 0.02 | 0.02 | — | — |
| $ZrO_2$ | — | — | — | — | — | — | — | — | — | — | 4.02 | 1.47 |
| $SnO_2$ | — | — | — | — | — | — | — | — | — | — | — | — |
| $TiO_2$ | 0.01 | 0.01 | 0.01 | 0.01 | 0.01 | 0.01 | 0.01 | 0.01 | 0.01 | 0.01 | 0.02 | 1.78 |
| $P_2O_5$ | — | — | — | — | — | — | — | — | — | — | — | — |
| ZnO | — | — | — | — | — | — | — | — | — | — | — | 1.66 |
| $B_2O_3$ | — | — | — | — | — | — | — | 2.00 | — | 2.00 | — | — |
| $Sb_2O_3$ | — | — | — | — | — | — | — | — | — | — | — | 0.32 |
| $F^-$ | — | — | — | — | — | — | — | — | — | — | — | 0.26 |
| Total | 100 | 100 | 100 | 100 | 100 | 100 | 100 | 100 | 100 | 100 | 99.96* | 99.91* |

*The total wt % for Commercial Products A and B are less 100% due to a round-off error.

The following procedure was practiced to make Samples 11-16. One hundred (100) grams of batch for each sample was thoroughly mixed and charged into a platinum crucible and placed in an electric furnace heated to 3000° F. (1649° C.). After two and one half hours, the glass melt (estimated to be at the log 3 temperature or 1000 poises) was removed from the furnace and poured into water at a temperature of 50° F. (10° C.). The solidified glass was dried, crushed, returned to the crucible and placed in the furnace at the temperature of 3000° F. (1649° C.). After two hours the glass melt was once again removed from the furnace and poured into cold water; the dried solidified glass was crushed and returned to the crucible and placed in the furnace at the temperature of 3000° F. (1649° C.). The temperature of the furnace was reduced to 2750° F. (1510° C.) and the crucible having the glass melt was left in the furnace overnight (approximately 15 to 16 hours). The next morning the furnace temperature was increased to 3000° F. (1649° C.). After two hours the crucible was removed from the furnace and the molten glass poured onto a steel plate and formed a glass slab as it cooled. The glass slab was moved into a furnace heated to 1350° F. (732° C.) for 1 hour. The furnace was shut off, and the glass slab was left in the furnace to cool overnight to anneal the glass slab.

Sample 11 has a glass composition similar to the glass composition of Sample 5. Sample 5 was duplicated because it had fewer crystallites and, as shown and discussed below, had better chemical strength results than Samples 14, 6 and 7, as will be discussed later in more detail. The glass slabs for Samples 13, 14 and 16 were opaque. The upper surface of the glass slabs of Samples 11, 12 and 15 were ground as previously discussed washed, dried and observed under 50× to 1000× magnification. Samples 11, 12 and 15 had a crystallite count similar to the crystallite count of Sample 5. Based on the results of the experiment, it was concluded that the crystallites are not caused by unmelted batch.

Samples 17-20 having the compositions shown on Table 2 were made to observe the effect on crystallization by varying the wt % of, or adding, $SiO_2$, $Al_2O_3$, $Li_2O$, $Na_2O$, MgO and $B_2O_3$ as compared to wt % ingredients for Sample 5. Samples 17-20 were made using the procedure to make Samples 1-7. Glass pieces of Sample 17 had a crystallite count similar to Sample 5. Comparing the wt % of ingredients of Samples 5 and 17, the $SiO_2$ was decreased and the $Al_2O_3$ and $Li_2O$ were increased. Based on a two-sample comparison, there is an indication that decreasing wt % of $SiO_2$ and $Li_2O$ and increasing the wt % of $Al_2O_3$ has minimal, if any, effect on crystallization. Comparing the wt % of ingredients of Sample 18 to Sample 5, Sample 18 had a decrease in $SiO_2$; an increase in $Al_2O_3$, $Li_2O$ and $Na_2O$, and the addition of $B_2O_3$. The glass pieces of Sample 18 had significantly more crystallites than Sample 5. Comparing the wt % of ingredients of Sample 19 to Samples 5 and 18, Sample 19 was similar to Sample 18 except Sample 19 had no $B_2O_3$ and had the addition of MgO. The glass pieces of Samples 18 and 19 had significantly more crystallites than Sample 5. Based on a three sample comparison, it appears that significant decrease in wt % of $SiO_2$, e.g. a 10% decrease, significant increase in wt % of $Na_2O$, e.g. 600% increase, and moderate increase in wt % of $Al_2O_3$, e.g. a 5% increase, compared to wt % of ingredients in Sample 5 increases crystallization. The addition of MgO and $B_2O_3$ on a two-sample comparison, e.g. Samples 18 and 19 is inconclusive, i.e. either has no effect on crystallization or a significant effect on crystallization. No data regarding crystallization for Sample 20 was collected because Sample 20 crystallized at 1300° F. (704° C.), which is below the desired glass bending temperature.

Also shown on Table 2 is Commercial Products A and B. Commercial Product A is a glass made on Jan. 25, 1997, at the Carlisle Plant of PPG Industries, Inc. located in Carlisle, Pa. Commercial Product B is a glass ceramic made in 1973 and sold by PPG Industries under the registered trademark Hercuvit. Commercial Products A and B are shown on Table 2 to compare glass compositions and properties of the glasses incorporating nonlimiting embodiments of the invention to glass compositions and selected properties of previously available commercial products.

The following experiment was conducted to determine the effect, if any heat has on the crystallites. Glass pieces cut from the glass slabs of Samples 1-7, 17 and 20 were thermally treated. The thermally heating process included the steps of placing the pieces in a Lindberg furnace, ramping the furnace up to the desired temperature, leaving the pieces in the furnace for a desired time period, turning the heat source off, partially opening the furnace door and allowing the glass pieces to cool. The temperature of the glass pieces was determined by reading the output of a thermocouple having a zirconium wire positioned on the surface of the glass piece. After the pieces reached room temperature, the major surfaces of the pieces were viewed under 50× to 1000× magnification. Unless indicated otherwise below, new glass pieces were used for each heating operation.

Glass pieces of Samples 1-4 and 6 were heated to a temperature of 900° F. (482° C.) for a period of 4 hours. No change in the number or size of the crystallites was observed. Glass pieces of Samples 1 and 6 were heated at 1100° F. (593° C.) for 4 hours; no change in the number or size of the crystallites was observed. Glass pieces of Samples 14 and 6 were heated to a temperature of 1300° F. (704° C.) for a period of 1 hour. No change in the number or size of the crystallites was observed for Samples 1-4; however the glass piece for Sample 6 showed a slight increase in the size of the crystallite. Glass pieces of Samples 14 and 6 were heated to a temperature of 1300° F. (704° C.) for a period of 2 hours. There was a slight increase in the size of the crystallites in Samples 1 and 2 compared to the increase in the size of crystallites of Sample 6; a moderate increase in the size of the crystallites for Samples 3 and 4 compared to the increase in the size of the crystallites of Samples 1, 2 and 6, and a large increase in the size of the crystallites of Sample 6 compared to the size of the crystallites for Samples 1 and 2.

Glass pieces of Samples 14, 6 and 7 were heated to a temperature of 1300° F. (704° C.) for a period of 4 hours. The following was observed for the glass pieces of Samples 1-4, 6 and 7. Sample 1: the crystallite size doubled, there was an increase in the number of surface crystallites and there were crystallites in the area of the zirconium thermocouple wire; Samples 24: the crystallite size doubled, and there were crystallites in the area of the zirconium thermocouple wire; Sample 6: the piece was white and polycrystalline and had a few surface crystallites, and Sample 7: there was a slight increase in the number of crystallites. Glass pieces of Samples 5, 17 and 20 were heated to a temperature of 1300° F. (704° C.) for a period of 6.2 hours. No changes in the number or size of the crystallites for Samples 5 and 17 were observed. The glass piece of Sample 20 had a hazy appearance indicating an increase in the size or number of crystallites. Glass pieces of Samples 5, 17 and 20 were heated to a temperature of 1427° F. (775° C.) for a period of 1 hour. No change was observed in the number or size of the crystallites of Samples 5 and 17; however Sample 17 had crystallites at the position of the zirconium thermocouple wire. The glass piece of Sample 20 was hazy and full of crystallites.

Glass pieces of Samples 1, 5-7, 17 and 20 were heated to a temperature of 1600° F. (871° C.) for a period of 1 hour. The glass piece of Samples 1 and 6 had a beige color; the glass piece of Sample 7 had a gray color; the glass of Sample 20 had a white color, and the glass pieces of Samples 1, 6, 7 and 20 were nearly completely crystallized. The glass pieces of Samples 5 and 17 were hazy and had an increase in the size of the crystallites. Glass pieces of Samples 1, 5-7, 17 and 20 were heated to a temperature of 1800° F. (982° C.) for a period of 1 hour. The glass piece of Samples 1 and 6 had a beige color; the glass piece of Sample 7 had a gray color; the glass pieces of Samples 5, 17 and 20 had a white color, and the glass pieces of Samples 1, 5-6, 7, 17 and 20 were nearly completely crystallized. Glass pieces of Sample 5 were heated to a temperature of 2051° F. (1122° C.) for a period of 3 minutes and at a temperature of 2054° F. (982° C.) for a period of 22.7 minutes. The glass pieces of Sample 5 had a white color and were nearly completely crystallized.

The above experiments were performed on glasses that were melted and annealed at high temperatures in laboratory crucibles indicating it is possible to form these glasses without significant crystallization. The appearance of crystals predominantly on the top surface indicates that the occurrence of these crystals is at least partially dependent upon process conditions evident at the glass surface and not solely due to glass composition. The experiments further indicate that post-glass-forming heat exposures can cause widespread crystallization of the glass. The temperature required for this crystallization is generally higher than the expected bending temperature of the glass, which should allow the glass to be shaped in a secondary bending operation without significant crystallization.

From the above experiment, it is concluded that the glass composition is important in determining how much crystallization occurs during heat treatment at high temperatures.

Glass pieces of each one of the samples was not heat treated at each of the times and temperatures because heat treatment of glass pieces of all the samples at all of the times and temperatures discussed above is not expected to provide any additional insight as to the effect of time and temperature on the crystallites.

As previously mentioned, Table 2 lists the composition of Commercial Products A and B. The wt % of the ingredients of Commercial Product A, except for $Li_2O$, was determined using X-ray fluorescence spectroscopy, and the wt % of $Li_2O$ was measured using atomic absorption spectroscopy. The file describing the procedure to determine the ingredients, and the wt % of the ingredients, of Commercial Product B is not available; however it is believed that the wt % of all the ingredients, except $Li_2O$, were determined using X-ray fluorescence spectroscopy. It is further believed that $Li_2O$ was determined using atomic absorption spectroscopy.

Coupons were cut from the slabs of Samples 1-7 and Commercial Product A to determine thermal and strength properties of the glass compositions. In general, the glass slabs, or pieces of the slab, of Samples 1-7 and Commercial Product A, were polished to the desired thickness by using grit mixed with water. Coupons of various sizes were cut from the polished slabs. Grinding and polishing of the coupons was performed as needed to provide a smooth surface. The edges of the coupons were slightly rounded using a 220 grit belt sander.

The log 10 viscosity temperature (bending temperature) and liquidus temperature of Sample 1 and Commercial Product A were measured. The log 10 temperature was measure according to ASTM C1350M-96, standard test method for measurement of viscosity of glass between softening point and annealing range by beam bending (Annual Book of ASTM Standards, Vol. 15.02 (2001) 423-426). The coupon had a length of 3.5 centimeters ("cm"), a thickness of about 3.1 millimeters ("mm") and a width of 2.8 mm. The temperature during the test was raised 5° C. per minute and lowered 4° C. per minute. The procedure was repeated three additional times and the four measurements averaged. The liquidus temperature was measured in accordance with the procedure set out in ASTM method C829-81.

Sample 1 had an average log 10 viscosity temperature of 1414° F. (768° C.) and a liquidus temperature of 2437° F. (1336° C.). Sample 5 had an average log 10 viscosity temperature of 1490° F. (810° C.), a liquidus temperature of 2575° F. (1413° C.) and a softening point temperature (log 7.6) of 1724° F. (940° C.); Sample 17 had an average log 10 viscosity temperature of 1499° F. (815° C.), a liquidus temperature of 2575° F. (1413° C.) and a softening point temperature of 1720° F. (938° C.), and Sample 20 had an average log 10 viscosity temperature of 1328° F. (720° C.), a liquidus temperature of 2493° F. (1367° C.), and a softening point temperature of 1544° F. (840° C.). The Commercial Product A had a log 10 viscosity temperature of 1112° F. (600° C.) and a liquidus temperature of 1533° F. (834° C.). The historical recorded softening point temperature (log 7.6) for Commercial Sample B is 1765° F. (963° C.) and the historical recorded liquidus temperature is 2430° F. (1332° C.). The above results show the glass compositions of Samples 1, 5, 17 and 20 have a log 10 viscosity temperature and liquidus temperature higher than Commercial Product A, and Samples 5, 17 and 20 had a softening point temperature lower than the softening point temperature of Commercial Product B, and a liquidus temperature about equal to or slightly higher than Commercial Product B. From the above results, it is noted that the glass of Samples 1, 5, 17 and 20 will maintain their shape at significantly higher temperatures than Commercial Product A. This makes the glass of the invention suitable for use in heated environments.

As can be appreciated from the above measured temperatures, nonlimiting embodiments of the invention have a log 10 viscosity of greater than 1328° F. (720° C.), greater than 1414° F. (768° C.) and in the temperature range of 1328° F. (720° C.) to 1499° F. (815° C.); a liquidus temperature greater than 2437° F. (1336° C.), greater than 2493° F. (1367° C.), and in the temperature range of 2437° F. (1336° C.) to 2575° F. (1413° C.), and a log 7.6 softening point temperature greater than 1544° F. (840° C.), greater than 1720° F. (938° C.), and in the temperature range of 1544° F. (840° C.) to 1724° F. (940° C.). The invention is not limited to the temperature ranges discussed hereinabove and nonlimiting embodiments of the invention contemplate glasses having a log 10 viscosity temperature greater than 1280° F. (694° C.), greater than 1350° F. (732° C.) and greater than 1414° F. (768° C.), and a liquidus temperature greater than 2350° F. (1288° C.), greater than 2400° F. (1316° C.) and greater than 2436° F. (1336° C.).

Glass coupons of Samples 1-7 and Commercial Product A were chemically tempered under varying conditions of time and temperature in a molten bath of 100% pure grade sodium nitrate. As can be appreciated, the composition of the molten bath of sodium nitrate is not limiting to the invention and other bath solutions that contain (or partially contain) other sodium salts such as sodium sulfate and sodium chloride are well known in the art. Optionally, the bath can be a mixture of sodium and potassium salts, although the portion of sodium salts preferably is high, e.g. above 50%, to obtain the acceptable abraded strength in the tempered glass article, e.g. above 40 KPSI (276 mPa). Sodium nitrate baths for chemical strengthening glass are well known in the art and the invention is not limited thereto. Based on the foregoing, no further discussion is deemed necessary.

The glass coupons of Samples 1-7 and Commercial Product A were weighed and placed in slots of a basket and submerged in the sodium nitrate bath for a predetermined time period with the bath at a preset temperature. Shown on Table 3 is data representative of the time period in hours and temperatures in ° C. for coupons for each Sample and the Commercial Product A. At the completion of the immersion, the samples were removed from the bath, allowed to cool in ambient air, rinsed with water to remove solidified salts from the glass surfaces, and the coupons dried.

The glass coupons were weighed after chemical tempering to determine weight gain of the coupons. The area of each surface of the weighed coupons was measured and the area of the six surfaces added and the sum divided into the weight gain for the coupon to give a weight gain per area. The weight gain of the coupons provides a quantitative measure of the degree of ion exchange. The average of the weight gain per area for the coupons and the Commercial Product A is listed on Table 3.

TABLE 3

Chemical strengthening particulars of Samples 1-7 coupons and the Commercial Product are listed on the Table 3. A cell having a "—" indicates that no test results are available

| Sample No. | Time in Hours | Temp. ° C. | Weight Gain (mg/cm$^2$) | Case Depth (mils) | AMOR (KPSI) | MOR (KPSI) | Center Tension (KPSI) (case depth coupon) | Center Tension (KPSI) (0.35 × 3 in. coupon) | CTA CD coupon (lbs./in.) | CTA 0.35 × 3 inches coupon (lbs./in.) | HV 1000 Vickers hardness (kg/mm$^2$) (Note G) | HK 1000 Knoop hardness (kg/mm$^2$) (Note G) |
|---|---|---|---|---|---|---|---|---|---|---|---|---|
| 1 | 16 | 374 | 1.4 | 7/10.8$^B$ | — | — | 6.1 | 6.5 | 678 | 700 | 614(576) | 520(503) |
| 1 | 22 | 374 | 1.6 | 10.6/12.8$^B$ | 76 | 89 | 6.4 | 7 | 600 | 718 | 604(576) | 513(503) |
| 1 | 16 | 405 | 2.0 | 12.7/15.2$^B$ | 78 | 108 | 8 | 9/9.6$^C$ | 749 | 886/919$^C$ | 598(576) | 522(503) |
| 1 | 22 | 405 | 2.4 | 14/17.4$^B$ | 77 | 112 | 8.7 | 10.4 | 733 | 977 | 586(576) | 505(503) |
| 2 | 16 | 374 | — | 10.4 | — | — | 6.7 | 7.4 | 684 | 754 | 606(580) | 529(499) |
| 2 | 22 | 374 | 1.9 | 12.7 | 72 | 91 | 6.5 | 8.6 | 554 | 831 | 600(580) | 503(499) |
| 2 | 16 | 405 | 2.3 | 14.9 | 77 | 93 | 9.0 | 10.4/10.9$^C$ | 813 | 961/1006$^C$ | 600(580) | 510(499) |
| 2 | 22 | 405 | 2.7 | 16.5 | 75 | 82 | 11 | 11.9 | 979 | 1072 | 597(580) | 508(499) |
| 3 | 16 | 374 | — | 9.7 | — | — | 6.2 | 7 | 656 | 730 | 611(584) | 526(503) |
| 3 | 22 | 374 | 1.8 | 11.3 | 75 | 90 | 7 | 7.8 | 680 | 790 | 606(584) | 509(503) |
| 3 | 16 | 405 | 2.2 | 14.1 | 78 | 90 | 8.3 | 9.8/10.3$^C$ | 743 | 944/984$^C$ | 599(584) | 505(503) |
| 3 | 22 | 405 | 2.6 | 16 | 77 | 102 | 10 | 11.7 | 910 | 1080 | 600(584) | 519(503) |
| 4 | 16 | 374 | — | 10.1 | — | — | 5.5 | 7 | 688 | 697 | 606(577) | 520(495) |
| 4 | 22 | 374 | 1.8 | 12.1 | 74 | 76 | 5.7 | 8.3 | 632 | 804 | 601(577) | 524(495) |
| 4 | 16 | 405 | 2.2 | 14.2 | 67 | 78 | 8.3 | 10.2/10.5$^C$ | 768 | 922/959$^C$ | 606(577) | 505(495) |
| 4 | 22 | 405 | 2.6 | 15.7 | 73 | 71 | 10.1 | 12 | 947 | 1045 | 590(577) | 506(495) |
| 5 | 8 | 374 | 1.4 | 9.7 | 43 | — | — | 7.4 | — | 789 | — | — |
| 5 | 16 | 374 | 2.5 | 13.3 | — | — | — | 10.3 | — | 1033 | — | — |
| 5 | 8 | 405 | 2.5 | 14.8 | — | — | — | 12.6 | — | 1176 | — | — |
| 5 | 18 | 405 | 3.6 | 16.5 | — | — | — | 14.9 | — | 1390 | — | — |
| 6 | 16 | 374 | 1.4 | 8.1 | — | — | — | 5.7 | — | 632 | — | — |
| 6 | 22 | 374 | 1.5 | 10.4 | — | — | — | 6.7 | — | 706 | — | — |
| 6 | 16 | 405 | 1.8 | 12.1 | — | — | 7.6 | — | 769 | — | — | — |
| 6 | 22 | 405 | 2.2 | 12.7 | — | — | — | — | — | — | — | — |
| 7 | 22 | 374 | 1.6 | 10.7 | 78.6 | 106 | — | 6.9 to 7.7/8.3$^C$ | — | 689 to 773 | — | — |
| 7 | 16 | 385 | 1.4 | 10.2 | — | — | — | 7.3 | — | 742 | — | — |
| 7 | 22 | 385 | 1.6 | 11.1 | — | — | — | 8.4 | — | 839 | — | — |
| 7 | 16 | 405 | 2.0 | 11.5 | 78.3 | 99 | — | 8.4 to 8.6/10$^C$ | — | 822/828$^H$ | — | — |
| 7 | 22 | 405 | 2.3 | 13.3 | 79.8 | 107 | — | 9.7 to 10.1/11.7$^C$ | — | 895/951$^H$ | — | — |
| 7 | 46 | 425 | 3.3 | 14.7 | 74.7 | 93 | — | 15.1/16.6$^C$ | — | 1269 | — | — |
| 7 | 16 | 425 | 2.4 | 15.1 | — | — | — | 11.2 | — | 1012 | — | — |
| 7 | 22 | 425 | 2.7 | 16.8 | — | — | — | 12.6 | — | 1123 | — | — |
| CP-A | 22 | 385 | 1.0 | 15.6 | — | — | — | 2.7 | — | — | — | — |
| CP-A | 16 | 405 | 1.1 | 13.7 | — | 66 | — | 2.8 | — | — | — | — |
| CP-A | 22 | 405 | 1.3 | 15.2 | — | 72 | — | 3.1 | — | — | — | — |
| CP-A | 46 | 405 | 1.9 | 20.3 | — | 66 | — | 4.1 | — | — | — | — |
| CP-A | 16 | 425 | 1.4 | 15.3 | — | — | — | 2.5 | — | — | — | — |
| CP-A | 22 | 425 | 1.6 | 15.8/18.3$^B$ | — | 62 | — | 2.8/3$^C$ | — | — | — | — |

NOTES:
A. CP-A is designation for Commercial Product A
$^B$Values on the right are for coupons having dimensions of 0.22 inches ('in.") by 0.24 in. by 3 in. (5.6 millimeters ("mm") by 6.1 mm by 76 mm). Otherwise, the values were measured on samples about 0.11 in. by 0.11 in. by 1.5 in. (2.8 mm by 2.8 mm by 3.8 centimeters ("cm")).
$^C$Numbers on the left are on coupons having a contact area of 0.35 in. × 3 in. (0.89 mm by 7.6 cm), and the numbers on the right have a contact surface of 1 in. × 8 in. (2.54 cm by 20 cm).
D. Numbers indicate distribution range of measured values.
E. Numbers that are connected by a "to" indicate distribution range of measured values.
F. The size of the coupon was 1 in. × 8 in. (2.54 cm by 20 cm).
G. Numbers in parenthesis are test results for coupons that were not chemically tempered.
$^H$The two values are two different measurements of the same coupons.

A comparison of the weight gain of the coupons of Samples 1-7 and Commercial Product A for similar times and temperatures shows that the nonlimiting glass compositions of the invention represented by Samples 1-7 have a higher weight gain than Commercial Product A. A higher weight gain is representative of a faster exchange rate and a greater degree of ion exchange. It may be indicative of higher stress levels and strength if stress relaxation is insignificant. No historical weight gain data has been identified for Commercial Product B.

The case depth for two coupons 3 mm by 3 mm by 3.8 cm for each of the different times and temperatures for each Sample 1-7 were measured by viewing the cross section of the coupon with a quartz wedge microscope. The case depths of two coupons for Sample 1 having dimensions of 5.6 mm by 6.1 mm by 7.6 cm were measured for a comparison of case depths for a thicker piece of glass. Commercial Product A coupons were 4.8 mm by 3.0 mm by 3.8 cm. The results of the measurement are listed on Table 3. For the same time and temperature, the case depth of the thinner coupons appears to be equal to or less than the case depth for Commercial Product A. However, the thicker coupons of Sample 1 have a greater case depth. It is recognized in the art that thicker glasses have deeper case depth; therefore, a comparison between case depth for thick glass coupons and thinner glass coupons should not be made. Historical data for Commercial Product B of 5.6 mm thickness show a case depth of 13.5 mils for coupons heated at a temperature of 454° C. for 4 hours, and a case depth of 26 mils for coupons heated at the same temperature for 16 hours. The case depth is a useful property to indicate resistance to damage and it is believed that case depths in excess of about 10 mils are desirable for certain applications of the glass such as aircraft transparencies. The nonlimiting glass compositions of the invention meet that criterion.

Coupons for modulus of rupture ("MOR") measured 5.4 cm by 5.4 cm by 3.0 mm thick, and coupons for abraded modulus of rupture ("AMOR") measured 2.54 cm by 20.3 cm by 3 mm thick. Eight (8) to 12 coupons for AMOR had 2.54 cm diameter circle abraded in the center of a major surface of the coupon with 2 cm$^3$ of 100B Norton Alundum abrasive or equivalent at 30 pounds per square inch ("psi") for five seconds. A similar number of coupons without an abraded surface were set aside for the MOR testing. The test to measure AMOR uses a four point simply support arrangement, which includes placing a major surface of a coupon on parallel 6.2 mm diameter cylinders spaced 15.2 cm apart and placing a platform on two parallel 6.2 mm diameter cylinders spaced 5.08 cm from one another on the upper surface of the coupon. For the AMOR test, the surface of the coupon having the abraded portion faces the platform, and the abraded portion is between the cylinders supporting the platform. An increasing measured force is applied to the platform until the coupon fractures.

MOR coupons are tested using a concentric ring apparatus. In this test, the glass coupon is placed on the support ring of 2 in. (5.08 cm) diameter and the load ring of 1 in. (2.54 cm) diameter is placed on the glass so that the rings are concentric and the glass is centered between the rings. Prior to assembly, the glass is inspected for obvious flaws, which are marked, and the sample is taped so as to enable a determination of the location of the origin of the fracture. On rare occasions, the glass fractured at a predetermined flaw or outside the highly stressed area and, in these cases, the data was omitted from consideration.

The force required to fracture the coupon and the dimensions of the coupon are used to calculate the stress at failure according to known formulas. The average of the coupons for each of Samples 1-7 and Commercial Product A is listed on Table 3. The AMOR for Commercial Product A was not measured using this test. The historical data for Commercial Product B shows an MOR of 60 KPSI and 50 KPSI after chemical strengthening for 4 and 16 hours, respective at 454° C. The AMOR and MOR values for coupons of Samples 1-7 generally have higher values than Commercial Product A and it is expected that the chemically tempered glass of the instant invention is as strong if not stronger than the glass of Commercial Product A.

A coupon of each Sample 1-7 used to measure case depth was used to measure the center tension. The center tension of a coupon of each Sample 1-6 used to measure case depth was used to measure the center tension. For Sample 7, the dimensions were 3.0 mm thick by 4.8 mm depth by 3.8 cm length. The center tension was measured using a quartz wedge microscope to obtain the optical retardation at the center of the coupon. The optical retardation divided by the sample depth or birefringence was converted to the tensile stress using the stress-optical coefficient of 1.84 (psi-inch)/mu. The use of this coefficient for Samples 1-7 allows a close approximation of center tension due to the relative similarities in glass composition. The center tension values for the case depth coupons measured are listed in the column titled "Center Tension (KPSI) (case depth coupon)." Center tension values have a very high dependence on thickness of the coupon since the surface of all coupons are nearly similarly compressed and the balancing tensile forces on the interior of the glass are applied over the central region which can vary widely in thickness.

The center tension of a coupon having a major surface of 0.35 in by 3 in (8.9 mm by 7.6 cm) or 1 in by 8 in (2.54 cm by 20 cm) for Samples 1-7 and the Commercial Product A were additionally measured practicing the procedure discussed above. The measurements are listed on Table 3. It is believed that these numbers provide a more accurate estimate of the center tension of a larger plate since the edge effects occur in a smaller portion of the depth of the sample. The number on the left for Samples 1-4 for 16 hours at 405° C. were the result of measurements on a surface 0.35 in by 3 in., and the number on the right for surface having 1 in by 8 in. It can therefore be observed that, for samples of short depth, the reported values are an underestimate of the value in a larger plate. Small samples are used since the image of the stress profile as viewed through the quartz wedge microscope deteriorates as the sample becomes too deep and the tensile stress becomes large.

The Center Tension Area (CTA) value provides a measure of the total stress in the glass and partially takes into account the varying thicknesses of samples. The CTA value is calculated from the sample thickness, case depth, and center tension values and is an attempt to estimate the stress through the thickness of the glass. Thus, the center tension value is multiplied by the (thickness of the coupon minus 2 times the case depth of the coupon) to obtain the CTA value in pounds/inch. The data indicates that Samples 1-7 have a significantly higher CTA values than Commercial Product A.

Chemically tempered coupons and non-tempered coupons of Samples 1-7 were measured for Knoop hardness and Vickers hardness according to ASTM C-730-98 [2003] using a 1000 gram force to determine the resistance of the coupon to surface penetration. The results of the Vickers hardness test is in the column of Table 3 titled "HV 1000" and the results of the Knoop hardness test is the column titled "HK 1000." The values are given in kilograms force per square millimeter (kg-f/mm$^2$). The values in parenthesis are the measurement for the non-tempered coupons. From Table 3, it is seen that all the chemically tempered coupons were stronger than the untempered coupons. No measurements are available for Commercial Products A and B.

The chemical durability of the glass of Samples 14 and 7 were determined by submerging glass pieces of a sample into a container of boiling 0.50 wt % sulfuric acid and covering the container. After 30 minutes, the glass pieces are removed from the acid, cooled, rinsed and dried. The weight in grams and area in square cm of the glass pieces were measured before putting the glass pieces in the acid and after the samples were dried. The difference in weight of the pieces is divided by the area of the pieces and the quotient multiplied by 2 to obtain the loss in grams per square cm-hour. Below is the glass loss for Samples 1-4 and 7 in milligrams per square cm-hour ("mg/cm$^2$-hr"): The loss is in the range of 0.002 to 0.014 mg/cm$^2$-hr.

| Sample | Loss |
| --- | --- |
| 1 | 0.013 |
| 2 | 0.014 |
| 3 | 0.005 |
| 4 | 0.002 |
| 7 | 0.007 |

Historical data for Commercial Product A shows a loss of 0.007 milligrams per square cm-hour. Previous experience with various glasses indicates that values of about 0.02 milligrams per square cm-hour and less are suitable for use where the surface of the glass is exposed. As can be concluded from the above data, the acid resistances of the glasses of the instant invention are similar to that of Commercial Product A. Commercial Product A has a commercial use history of Being quite durable. No historical data is available for Commercial Product B. The Compositions of Samples 21-26 listed on Table 4 below were formulated based on The ingredients and performance of Samples 1-20 discussed above.

The compositions of Samples 21-26 listed on Table 4 below are hypothetical compositions formulated based on the ingredients and performance of Samples 1-20 discussed above.

TABLE 4

Glass compositions of predictive examples. The ingredients and wt % range for each ingredient of nonlimiting glass

| Oxide | 21 | 22 | 23 | 24 | 25 | 26 |
| --- | --- | --- | --- | --- | --- | --- |
| SiO$_2$ | 66.75 | 66.25 | 66.75 | 65.1 | 64.6 | 65.25 |
| Al$_2$O$_3$ | 22 | 22 | 22 | 22 | 22 | 22 |
| Li$_2$O | 6 | 6.5 | 6 | 6 | 6.5 | 6 |
| Na$_2$O | 1.5 | 1.5 | 1.5 | 1.5 | 1.5 | 1.5 |
| K$_2$O | 0.1 | 0.1 | 0.1 | 0.25 | 0.25 | 0.1 |
| CaO | — | — | — | 0.5 | 0.5 | 0.5 |
| MgO | 1.6 | 1.6 | 1.6 | 1.6 | 1.6 | 1.6 |
| SO$_3$ | — | — | — | — | — | — |
| Fe$_2$O$_3$ | 0.05 | 0.05 | 0.05 | 0.05 | 0.05 | 0.05 |
| MnO$_2$ | — | — | — | — | — | — |
| ZrO$_2$ | — | — | 1.5 | 1 | 1 | 1.5 |
| SnO$_2$ | 0.5 | 0.5 | 0.5 | 0.5 | 0.5 | 0.5 |
| TiO$_2$ | — | — | — | 0.5 | 0.5 | 0.5 |
| P$_2$O$_5$ | 1 | 1 | — | — | — | — |
| ZnO | 0.5 | 0.5 | — | 0.5 | 0.5 | — |
| B$_2$O$_3$ | — | — | — | 0.5 | 0.5 | 0.5 |
| Sb$_2$O$_3$ | — | — | — | — | — | — |
| Total | 100 | 100 | 100 | 100 | 100 | 100 | compositions of the invention developed from Tables 1, 2 and 4 are listed in Table 5 below. The first column lists the ingredients and the wt % range for glasses developed from the ingredients of Samples 1-7 and 11-26 listed on Tables 1, 2 and 4. The second column lists the ingredients and the wt % range for glasses developed from the ingredients of Samples 1-7 and 17-20 listed on Tables 1 and 2. The third column lists the ingredients and the wt % range for glasses developed from the ingredients of Samples 17-20 listed on Table 2, taking into consideration the operational ranges of ingredients based on the other samples. The fourth column lists the ingredients and the wt % range for glasses developed from the ingredients of Samples 1-7 listed on Table 1. The fifth column lists the ingredients and the wt % range for glasses developed from the ingredients of Samples 21-26 listed on Table 4.

TABLE 5

| Ingredient | Column 1<br>Samples 1-7 and 11-26<br>Percent by Weight | Column 2<br>Samples 1-7 and 17-20<br>Percent by Weight | Column 3<br>Samples 17-20<br>Percent by Weight | Column 4<br>Samples 1-7<br>Percent by Weight | Column 5<br>Samples 21-26<br>Percent by Weight |
| --- | --- | --- | --- | --- | --- |
| SiO$_2$ | 63.42 to 74.29 | 63.42 to 69.29 | 63.42 to 66.29 | 64.83 to 69.29 | 64.6 to 66.75 |
| Al$_2$O$_3$ | 18.26 to 28.51 | 21 to 26 | 24.87 to 26 | 21 to 23.51 | 22 |
| Li$_2$O | 4.94 to 7.5 | 4.94 to 7 | 5 to 7 | 4.94 to 6.5 | 6 to 6.5 |
| Na$_2$O | 0.39 to 2.39 | 0.39 to 2.39 | 0.39 to 2.39 | 0.39 to 2 | 1.5 |
| K$_2$O | 0.07 to 0.25 | 0.07 to 0.1 | 0.07 to 0.1 | 0.07 to 0.1 | 0.1 to 0.25 |
| CaO | 0 to 1.27 | 0 to 1.27 | 0 to 0.04 | 0 to 1.27 | 0 to 0.5 |
| MgO | 0 to 2.6 | 0 to 2.6 | 0 to 2.6 | 0 to 2.49 | 1.6 |
| SO$_3$ | 0 to 0.19 | 0 to 0.19 | 0 to 0.09 | 0 to 0.19 | 0 |
| Total iron as Fe$_2$O$_3$ | 0.05 to 0.061 | 0.05 to 0.061 | 0.05 to 0.061 | 0.05 to 0.061 | 0.05 |
| MnO$_2$ | 0 to 0.02 | 0 to 0.02 | 0 to 0.02 | 0 to 0.02 | 0 |
| ZrO$_2$ | 0 to 1.5 | 0 to 1.19 | 0 | 0 to 1.19 | 0 to 1.5 |
| Total tin as SnO$_2$ | 0 to 0.5 | 0 to 0.5 | 0 | 0 to 0.5 | 0.5 |
| TiO$_2$ | 0 to 1.89 | 0 to 1.89 | 0 to 0.01 | 0 to 1.89 | 0 to 0.5 |
| P$_2$O$_5$ | 0 to 1.06 | 0 to 1.06 | 0 | 0 to 1.06 | 0 to 1 |
| ZnO | 0 to 0.5 | 0 to 0.5 | 0 | 0 to 0.5 | 0 to 0.5 |
| B$_2$O$_3$ | 0 to 2 | 0 to 2 | 0 to 2 | 0 to 1.55 | 0 to 0.5 |
| N(Al$_2$O$_3$ + ZrO$_2$) | 18.26 to 28.51 | 21 to 26 | 24.87 to 26 | 21 to 23.51 | 22 to 23.5 |
| RO(CaO + MgO) | 0.04 to 2.64 | 0.04 to 2.64 | 0.04 to 2.64 | 0.04 to 2.54 | 1.6 to 2.1 |
| R$_2$O(Na$_2$O + K$_2$O) | 0.49 to 2.49 | 0.49 to 2.49 | 0.49 to 2.49 | 0.49 to 2.07 | 1.6 to 1.75 |

As can be appreciated, the ingredients having a range with the lower limit "0" are considered ingredients that can be omitted from the composition. Further in the practice of the invention, the narrow ranges or single wt % values can be expanded to be within or be any of the ranges discussed for that ingredient. By way of illustration, but not limiting to the invention, $Fe_2O_3$ in the range of 0.05 to 0.061 or the wt % of 0.050 can be expanded to a range of less than 1.25 wt %, e.g. in the range of 0 wt % or a tramp amount to 1.25 wt %, preferably less than 1.00 wt %, e.g. in the range of 0 wt % or a tramp amount to 1.00 wt %, and more preferably less than 0.50 wt %, e.g. in the range of 0 wt % or a trace amount to 0.50 wt %.

Nonlimiting embodiments of the invention for glasses having ingredients in the ranges listed in Column 5 above, and which are heated for 16 to 22 hours at 374° C. in a molten bath of 100% pure grade sodium nitrate include, but are not limited to, glasses having at least one of the following properties: a weight gain in the range of 1.4 to 2.5 mg/cm$^2$, a case depth in the range of 7 to 13.3 mils, an AMOR in the range of 72 to 78.6 KPSI, an MOR in the range of 76 to 106 KPSI, a center tension in the range of 6.1 to 10.3 KPSI, a CTA in the range of 554 to 1033 pounds/inch, a Vickers hardness in the range of 600 to 614 kg/mm$^2$, and/or a Knoop hardness in the range of 503 to 526 kg/mm$^2$. Further, nonlimiting embodiments of the invention for glasses having ingredients in the ranges listed in Column 5 above, and which are heated for 16 to 22 hours at 405° C. in a molten bath of 100% pure grade sodium nitrate include, but are not limited to, glasses having at least one of the following properties: a weight gain in the range of 1.8 to 2.7 mg/cm$^2$, a case depth in the range of 11.5 to 17.4 mils, an AMOR in the range of 77 to 78 KPSI, an MOR in the range of 71 to 112 KPSI, center tension in the range of 6.1 to 10.3 KPSI, a CTA in the range of 749 to 1080 pounds/inch, a Vickers hardness in the range of 598 to 606 kg/mm$^2$, and/or a Knoop hardness in the range of 505 to 522 kg/mm$^2$. The above ranges were developed from the data on Table 3.

The chemical strengthened glasses of invention can be used in the manufacture of aircraft transparencies. The glass can be part of a laminated transparency or a monolithic transparency. The invention contemplates shaping the glass, chemically tempering the shaped glass, using one or more pieces of the shaped glass with one or more pieces of plastic and/or standard soda-lime-silica glass to form a laminate and securing a mounting frame to the laminate to provide an aircraft transparency and securing the frame of the transparency to the aircraft body. The foregoing identified processes are well known in the art and no further discussion is deemed necessary.

The invention contemplates applying a coating to one or both the major surfaces of the chemically strengthened glass before or after fabricating the strengthened glass into an article, e.g. a transparency for a vehicle. For example, but not limiting to the invention, the outer surface of the article can include a self cleaning coating, e.g. of the type disclosed in U.S. Pat. No. 6,027,766 and/or sold by PPG Industries, Inc under their trademark SUNCLEAN and/or a hydrophobic coating of the type disclosed in U.S. Pat. No. 6,025,025 sold by PPG Industries Inc. under the trademark SURFACE SEAL, which patents are herby incorporated by reference. Further the invention contemplates applying electrically heatable coating or solar control coatings of the type used in the art, e.g. U.S. Pat. No. 5,364,685, which patent is hereby incorporated by reference, to one or both the major surfaces of the glass of the present invention.

Based on the description of the embodiments of the invention, it can be appreciated that this invention is not limited to the particular embodiments disclosed, but it is intended to cover modifications that are within the spirit and scope of the invention, as defined by the appended claims.

What is claimed is:
1. A glass, comprising:

| Ingredient | Percent by weight |
|---|---|
| $TiO_2$ | 0 to 0.75; |
| $SiO_2$ | 63.42 to 74.29; |
| $Al_2O_3$ | 18.26 to 28.51; |
| $Li_2O$ | 4.94 to 7.5; |
| $Na_2O$ | 0.39 to 2.39; |
| $K_2O$ | 0.07 to 0.25; |
| CaO | 0 to 1.27; |
| MgO | 0 to 2.6; |
| $SO_3$ | 0 to 0.19; |
| Total iron as $Fe_2O_3$ | 0.05 to 0.061; |
| $MnO_2$ | 0 to 0.02; |
| $ZrO_2$ | 0 to 1.5; |
| Total tin as $SnO_2$ | 0 to 0.5; |
| $TiO_2$ | 0 to 1.89; |
| $P_2O_5$ | 0 to 1.06; |
| ZnO | 0 to 0.5; |
| $B_2O_3$ | 0 to 2; |
| NF($Al_2O_3 + ZrO_2$) | 18.26 to 28.51; |
| RO(CaO + MgO) | 0.04 to 2.64; |
| $R_2O(Na_2O + K_2O)$ | 0.49 to 2.49; and | wherein the glass has the following properties: (a) a log 10 viscosity temperature of at least 1280° F. (694° C.) and (b) a liquidus temperature of at least 2350° F. (1288° C.).

2. The glass according to claim 1, wherein the glass has at least one of the following properties: a log 10 viscosity temperature of at least 1413° F. (767° C.) and a liquidus temperature of at least 2436° F. (1336° C.).

3. A glass, comprising:

| Ingredient | Percent by weight |
|---|---|
| $SiO_2$ | 63.42 to 66.29; |
| $Al_2O_3$ | 24.87 to 26; |
| $Li_2O$ | 5 to 7; |
| $Na_2O$ | 0.39 to 2.39; |
| $K_2O$ | 0.07 to 0.1; |
| CaO | 0 to 0.04; |
| MgO | 0 to 2.6; |
| $SO_3$ | 0 to 0.09; |
| Total iron as $Fe_2O_3$ | 0.05 to 0.061; |
| $MnO_2$ | 0 to 0.02; |
| $ZrO_2$ | 0; |
| Total tin as $SnO_2$ | 0; |
| $TiO_2$ | 0 to 0.01; |
| $P_2O_5$ | 0; |
| ZnO | 0; |
| $B_2O_3$ | 0 to 2; |
| NF($Al_2O_3 + ZrO_2$) | 24.87 to 26; |
| RO(CaO + MgO) | 0.04 to 2.64; |
| $R_2O(Na_2O + K_2O)$ | 0.49 to 2.49; and | wherein the glass has the following properties: (a) a log 10 viscosity temperature of at least 1280° F. (694° C.) and (b) a liquidus temperature of at least 2350° F. (1288° C.).

4. The glass according to claim 3, wherein the glass has a log 10 viscosity temperature range of at least 1413° F. (767° C.) and a liquidus temperature of at least 2436° F. (1336° C.).

5. A glass, comprising:

| Ingredient | Percent by weight |
| --- | --- |
| $TiO_2$ | 0 to 0.75; |
| $SiO_2$ | 63.42 to 69.29; |
| $Al_2O_3$ | 21 to 26; |
| $Li_2O$ | 4.94 to 7; |
| $Na_2O$ | 0.39 to 2.39; |
| $K_2O$ | 0.07 to 0.1; |
| CaO | 0 to 1.27; |
| MgO | 0 to 2.6; |
| $SO_3$ | 0 to 0.19; |
| Total iron as $Fe_2O_3$ | 0.05 to 0.061; |
| $MnO_2$ | 0 to 0.02; |
| $ZrO_2$ | 0 to 1.19; |
| Total tin as $SnO_2$ | 0 to 0.5; |
| $TiO_2$ | 0 to 1.89; |
| $P_2O_5$ | 0 to 1.06; |
| ZnO | 0 to 0.5; |
| $B_2O_3$ | 0 to 2; |
| NF($Al_2O_3 + ZrO_2$) | 21 to 26; |
| RO(CaO + MgO) | 0.04 to 2.64; |
| $R_2O(Na_2O + K_2O)$ | 0.49 to 2.49; and | wherein the glass has the following properties: (a) a log 10 viscosity temperature of at least 1280° F. (694° C.) and (b) a liquidus temperature of at least 2350° F. (1288° C.).

6. The glass according to claim 5, wherein the glass has a log 10 viscosity in the temperature range of 1328° F. (720° C.) to 1499° F. (815° C.), a liquidus temperature in the temperature range of 2437° F. (1336° C.) to 2575° F. (1413° C.), and a log 7.6 softening point temperature in the temperature range of 1544° F. (840° C.) to 1724° F. (940° C.).

7. A glass composition for chemical tempering comprising:

| Ingredient | Percent by weight |
| --- | --- |
| $SiO_2$ | 64 to 72; |
| $Al_2O_3$ | 20 to 25; |
| $Li_2O$ | 4.50 to 7; |
| $TiO_2$ | 0 to 0.75; |
| $Na_2O$ | 0.3 to 3; |
| $K_2O$ | 0 to 0.5; |
| CaO | 0 to 3; |
| MgO | 0 to 3; |
| $SO_3$ | 0 to 0.20; |
| Total iron as $Fe_2O_3$ | 0 to 1.25; |
| $ZrO_2$ | 0 to 3; |
| Total tin as $SnO_2$ | 0 to 0.70; |
| $TiO_2$ | 0 to 5; |
| $P_2O_5$ | 0 to 1.75; |
| ZnO | 0 to 1.25; and |
| $B_2O_3$ | 0 to 1.75; | where CaO+MgO defined as RO is 0 to 4 wt %; $Al_2O_3$+$ZrO_2$ defined as NF is 20 to 26 wt %, and $Na_2O$+$K_2O$ defined as $R_2O$ is 0.30 to 1.50 wt %, and wherein the glass composition has the following properties: (a) a log 10 viscosity temperature of at least 1280° F. (694° C.) and (b) a liquidus temperature of at least 2350° F. (1288° C.).

8. A glass composition for chemical tempering comprising:

| Ingredient | Percent by weight |
| --- | --- |
| CaO | 0.00 to 1.27; |
| MgO | 0.00 to 2.49; |
| $SO_3$ | 0.00 to 0.19; |
| Total iron as $Fe_2O_3$ | 0.00 to 0.50; |
| $MnO_2$ | 0.00 to 0.02; |
| $ZrO_2$ | 0.00 to 1.50; |
| Total tin as $SnO_2$ | 0.00 to 0.50; |
| $TiO_2$ | 0.00 to 1.89; |
| $P_2O_5$ | 0.00 to 1.06; |
| ZnO | 0.00 to 0.57; and |
| $B_2O_3$ | 0.00 to 1.55; | where CaO+MgO defined as RO is 0.04 to 2.54 wt %; $Al_2O_3$+$ZrO_2$ defined as NF is 22.00 to 23.51 wt %; and $Na_2O$+$K_2O$ defined as $R_2O$ is 0.49 to 2.04 wt % and wherein the glass composition has the following properties: (a) a log 10 viscosity temperature of at least 1280° F. (694° C.) and (b) a liquidus temperature of at least 2350° F. (1288° C.).

9. The glass composition according to claim 8, wherein the amounts of the respective compounds are as follows:

| Ingredient | Percent by weight |
| --- | --- |
| $SiO_2$ | 64.83 to 69.29; |
| $K_2O$ | 0.07 to 0.10; and | where $R_2O$ is 0.49 to 2.07 wt %.

10. The glass composition according to claim 9, wherein the amounts of the respective compounds are as follows:

| Ingredient | Percent by weight |
| --- | --- |
| $ZrO_2$ | 0.00 to 1.19; |
| ZnO | 0.00 to 0.50; and | where RO is 0.89 to 2.49 wt % and NF is 21.97 to 23.51 wt %.

* * * * *